Sept. 17, 1935.    J. G. GUTTMANN    2,014,473
TURN SIGNAL
Filed April 9, 1934
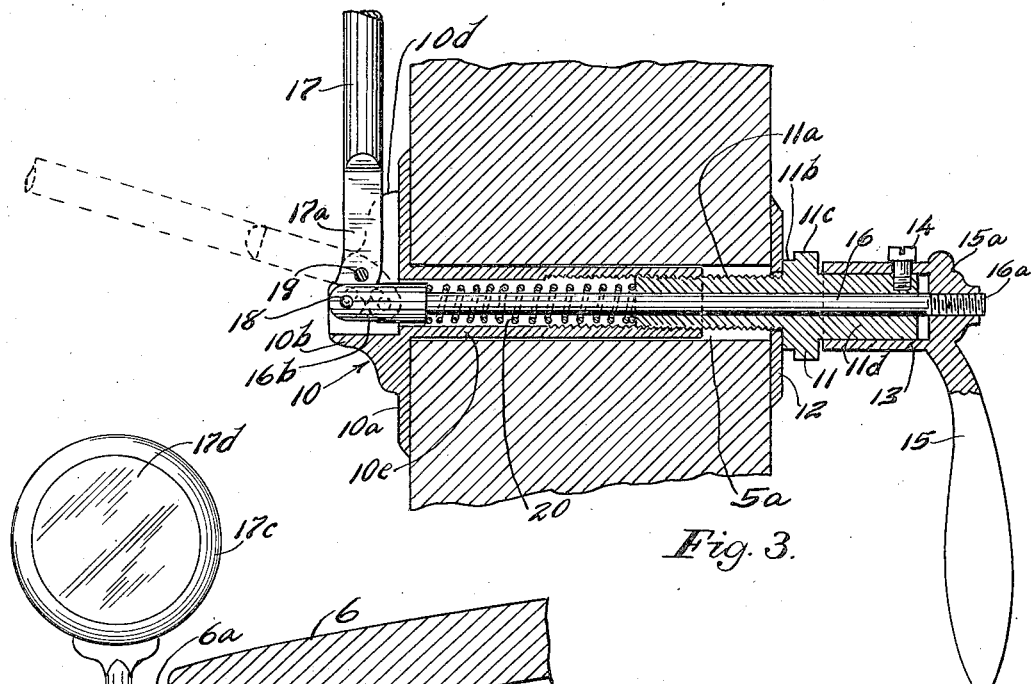
Fig. 3.
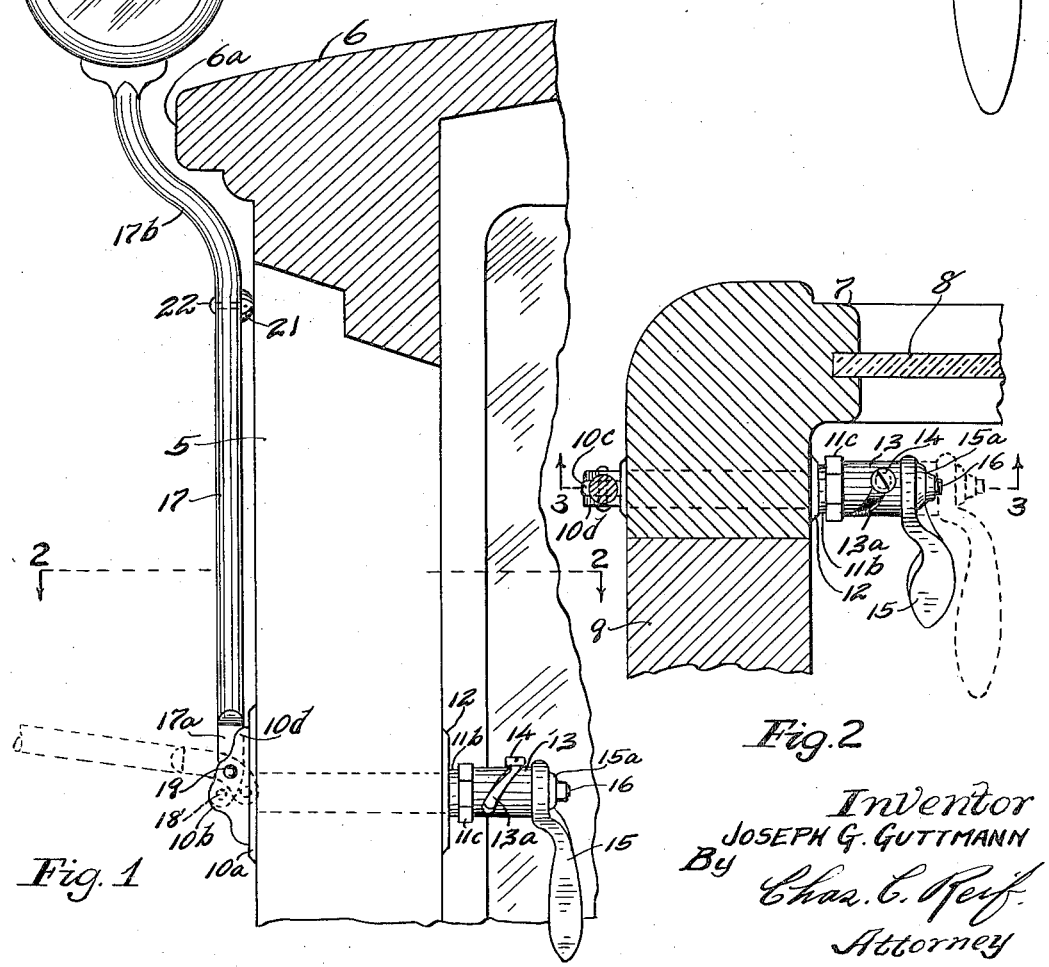
Fig. 2.
Fig. 1.
Inventor
JOSEPH G. GUTTMANN
By Chas. C. Reif.
Attorney Patented Sept. 17, 1935

2,014,473

UNITED STATES PATENT OFFICE 2,014,473

TURN SIGNAL

Joseph G. Guttmann, St. Paul, Minn.

Application April 9, 1934, Serial No. 719,649

6 Claims. (Cl. 116—52)

This invention relates to a signal device for a vehicle such as an automobile, and particularly to a signal adapted to indicate when the automobile is to make a turn, such as a left turn.

It is desirable in automobiles, especially those of the closed type, to have some simple and easily operated means for indicating to traffic when the vehicle is to make a turn, particularly a left turn. Many drivers signal a left turn by opening a door on the left hand side of the car or by extending the hand and arm through a window. It is laborious and inconvenient to open the door and it is inconvenient and uncomfortable to lower the window and extend the hand and arm especially in cold weather.

It is an object of this invention to provide an extremely simple and easily operated left turn signal which can be easily and quickly placed on all makes of cars.

It is a further object of the invention to provide a simple and easily operated turn signal comprising few parts, which parts can be readily assembled into operative position.

It is more specifically an object of the invention to provide a turn signal comprising a casing having parts disposed at the inner and outer sides of the body portion of the automobile and having portions extending through said body portion and connected together, said portions having a passage therethrough, a lever constituting a turn signal fulcrumed in the part of said casing at the outer side of said body portion, a member secured to said lever and extending through said passage, said other part having a sleeve journaled thereon, a handle secured to said sleeve and said member and means for causing longitudinal movement of said sleeve and member when said handle is oscillated to operate said lever together with means for returning the lever and handle to normal position.

These and other objects and advantages of the invention will be fully set forth in the following description made in connection with the accompanying drawing, in which like reference characters refer to similar parts throughout the several views and in which:—

Fig. 1 is a vertical section through a portion of an automobile showing the signal attached thereto, said signal appearing in side elevation;

Fig. 2 is a horizontal section through a portion of an automobile showing parts of the signal, said section being taken substantially on line 2—2 of Fig. 1 as indicated by the arrows; and Fig. 3 is a vertical section taken substantially on line 3—3 of Fig. 2 as indicated by the arrows.

Referring to the drawing, a part of an automobile is shown comprising a part of the body thereof. This comprises the post or door frame 5, a portion of the roof or top of the body 6 having the cornice portion 6a thereon. Post 5 has the front portion 7 and a portion of the windshield 8 carried thereby is illustrated. A portion 9 of one side door is also shown.

The device of the invention is adapted to be mounted in the post or door frame 5 and for this purpose a passage 5a is made in said post or frame preferably of cylindrical form. The device comprises a bracket 10 having a flange portion 10a of substantially rectangular form in front elevation and having a beveled edge, which flange fits against the outer side of the post or frame 5. A lug 10b projects from flange 10a and has a slot 10c formed in its upper portion thus providing a pair of spaced vertical flanges 10d. Bracket 10 has a sleevelike portion 10e extending into the passage 5a, which portion has a bore or passage extending therethrough, said bore being interiorly threaded at its inner end. A second bracket 11 is provided, somewhat in the form of a stud, the same having a cylindrical portion 11a extending into passage 5a and being exteriorly threaded to screw into the end of the portion 10e. Member 11 is provided with an enlarged collarlike portion 11b forming a shoulder adapted to engage the outer side of a plate 12. Said plate is of substantially rectangular form in elevation and as shown is provided with a beveled edge, the same being apertured to have portion 11a extend therethrough. Said plate engages the inner side of the post or frame 5 and member 11 is screwed into portion 10e until flange 10a and plate 12 are clamped tight against said post or frame. Member 11 is provided with a portion 11c which will have its periphery of hexagonal or other shape so as to be readily turned. A stem portion 11d projects from portion 11c, the same being of cylindrical form. A sleeve 13 is revolubly mounted on stem portion 11d and the same has formed therein a helical cam slot 13a. A screw 14 shown as having a slotted head extends through slot 13a and is fixedly secured in the stem portion 11d. A handle 15 is provided shown as integral with sleeve 13, the same having a hub portion 15a bored and threaded to be screwed onto and secured to the threaded end 16a of a rod 16 extending through a longitudinal bore formed in member 11 and through the passage or bore in bracket 10. Rod 16 has an enlarged headed portion 16b projecting into the slot 10c, the same being bifurcated and having disposed between the bifurcations thereof the flattened end 17a of a lever 17 which for the greater part of its length is in the form of a rod preferably of cylindrical form. Said portion 17a is connected to portion 16b by a headed rivet or pivot pin 18. Said portion 17a is also pivoted to or fulcrumed on the flanges 10d and a pivot pin 19 extends through portion 17a and flanges 10d, the same being held in place in any suitable manner as by having heads at its outer ends. A compression coiled spring 20 surrounds the rod 16 within portion 10e having one end bearing against the enlarged portion 16b and its other end bearing against the end of portion 11a of member 11. The rod 17 extends vertically along the frame or post 5 and has its upper end curved outwardly and upwardly as shown at 17b, said upper end being flattened and secured to a rim portion 17c within which is a colored glass signal portion 17d. While the portion 17d may be variously made, in practice it has been found to be very efficient to have this made of a novel form of red glass having small circular portions formed therein which make the same very distinctive either in daytime or at night. Lever 17 is provided with a button or bumper 21 shown as of semi-spherical form and secured to rod 17 by the rivet 22. Member 21 will be made of rubber or soft material and will prevent lever 17 from striking the side of the automobile and marring the same.

In operation, the device will normally occupy the position shown in Fig. 1 with rod 17 extending substantially vertically. The handle 15 is disposed within the automobile and in convenient position to be reached by the hand of the driver. When it is desired to signal a turn the driver presses on the handle 15 oscillating the same and rotating sleeve 13 upon stem 11d. Handle 15 rotates on the threads at the threaded portion 16a of rod 16, but this causes a negligible movement of said handle longitudinally of rod 16. A partial rotation of handle 15 moves sleeve 13 inwardly longitudinally of stem 11d quite a distance owing to the action of the cam slot 13a on the stationary pin or screw 14. As sleeve 13 thus moves inwardly handle 15 is also moved inwardly and pulls inwardly upon the rod 16. This pulls inwardly upon the end of lever 17 and said lever is swung outwardly about its pivot 19 into substantially horizontal position as indicated by the dotted lines in Figs. 1 and 3. As rod 16 thus moves inwardly or to the right as shown in Fig. 3, spring 20 is compressed. When the operator releases handle 15 spring 20 expands pushing rod 16 to the left, swinging lever 17 to its vertical position and moving handle 15 and sleeve 13 to the left. The parts are thus returned to normal position by spring 20.

The device can be easily and quickly installed upon practically all makes of cars. It is only necessary to drill a passage 5a in the door post or frame. The parts of the casing formed by brackets 10 and 11 can then be placed in position and member 11 screwed into portion 10e until portions 10a and 12 are clamped against the frame. The rod 16 can be made of the desired length and after the device is in place its threaded end 16a can be cut off to be substantially flush with the end of hub 15a.

From the above description it is seen that applicant has provided a very efficient signal and one that is quite simple in construction and comprises few parts. The device can be easily and inexpensively made and is quite easily and conveniently operated. The parts will, of course, be plated and finished to have a pleasing appearance. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. A turn signal having in combination, means constructed and arranged to extend through a support on an automobile, and be held in stationary relation thereto, said means having a passage therethrough, a lever fulcrumed on said means at the outer side thereof normally extending in substantially vertical position and constituting a turn signal, a member secured to said lever and extending through said passage to the interior of said automobile, an oscillatable handle movable on said means, means for moving said member longitudinally to swing said lever downwardly when said handle is oscillated and means for returning said lever and handle to normal position.

2. A turn signal having in combination, a casing having parts adapted to be disposed respectively at the inner and outer sides of a body portion of an automobile, said parts extending through said body portion and being threaded together and having a passage therethrough, a lever fulcrumed on said part at the outer side of said body portion disposed normally in substantially vertical position and adapted to swing downwardly and constituting a turn signal, a rod secured to said lever and extending through said passage, an oscillatable handle at the inner side of said body portion secured to said rod, a sleeve secured to said handle, means causing a longitudinal movement of said rod and sleeve when said handle is oscillated to swing said lever and a spring for returning said handle, rod and lever to normal position.

3. A turn signal having in combination, a casing having parts adapted to be disposed respectively at the inner and outer sides of a body portion of an automobile, said parts extending through said body portion and being threaded together and having a passage therethrough, a lever fulcrumed on said part at the outer side of said body portion disposed normally in substantially vertical position and adapted to swing downwardly and constituting a turn signal, a rod secured to said lever and extending through said passage, said part of said casing at the inner side of said body portion having a cylindrical stem, a sleeve revoluble on said stem and having a helical slot therethrough, a member secured in said stem extending into said slot, a handle secured to said sleeve to oscillate therewith and also secured to said rod whereby oscillation of said handle moves said sleeve and rod and swings said lever downwardly and a spring in said casing for moving said rod, sleeve and handle to normal position.

4. A turn signal having in combination, a bracket having a flange disposed at the outer side of a body portion of an automobile and having a sleevelike portion extending into said body portion, a lever fulcrumed on said flange and normally extending substantially vertically therefrom and constituting a turn signal, a second bracket disposed at the inner side of said body portion having a sleevelike portion extending into said body portion and threaded to said first mentioned sleevelike portion, said brackets having a passage therethrough extending through said sleevelike portions, said second bracket having a cylindrical stem at its inner side, a rod secured to said lever and extending through said passage, a sleeve journaled on said stem having a cam slot therein, a member secured to said stem and extending into said slot, a handle secured to said sleeve and to said rod whereby when said handle and sleeve are oscillated they are moved lengthwise of said stem and said rod is pulled upon and said lever is swung downwardly and a spring in said passage surrounding said rod and engaging the same to move said rod, lever and handle to normal position.

5. A turn signal having in combination, means forming a casing extending through a support on an automobile and having a passage therethrough, a lever fulcrumed on said means at the outer side of said automobile and constituting a turn signal, a rod secured to said lever and extending through said passage, a sleeve journaled on said means at the inner side of said automobile having a helical slot therethrough, a handle secured to said sleeve and rod and a stationary member extending into said slot whereby when said handle is turned said rod will be pulled upon and said lever swung downwardly and means for returning said handle and lever to normal position.

6. A turn signal for an automobile having in combination, a support at the outer side of said automobile, a lever fulcrumed on said support normally disposed in substantially vertical position and constituting a turn signal, a member secured to said lever and extending inwardly, a support at the inner side of said automobile and having a cylindrical portion at its inner end, a handle carried by said support and having a sleeve rotatable on said portion, means for moving said handle inwardly longitudinally of the axis of said sleeve when oscillated, said handle being connected to said member to move the same inwardly therewith and operate said lever.

JOSEPH G. GUTTMANN.